United States Patent
Feng et al.

(10) Patent No.: US 7,778,431 B2
(45) Date of Patent: Aug. 17, 2010

(54) SOUND ENHANCING STANDS FOR PORTABLE AUDIO DEVICES

(75) Inventors: Hui Feng, Cary, NC (US); William Chris Eaton, Cary, NC (US)

(73) Assignee: Sony Ericsson Mobile Communications, AB, Lund (SE)

( * ) Notice: Subject to any disclaimer, the term of this patent is extended or adjusted under 35 U.S.C. 154(b) by 1181 days.

(21) Appl. No.: 11/389,415

(22) Filed: Mar. 24, 2006

(65) Prior Publication Data

US 2007/0223745 A1 Sep. 27, 2007

(51) Int. Cl.
*H04R 25/00* (2006.01)
*H04R 1/20* (2006.01)

(52) U.S. Cl. ...................... 381/160; 381/345

(58) Field of Classification Search ............... 381/160, 381/345, 349, 350; 379/430
See application file for complete search history.

(56) References Cited

U.S. PATENT DOCUMENTS

| | | | |
|---|---|---|---|
| 3,443,661 A | 5/1969 | Sciver | |
| 6,520,282 B1 | 2/2003 | Hadzic et al. | |
| 2002/0009195 A1* | 1/2002 | Schon | 379/454 |
| 2003/0059075 A1 | 3/2003 | Niederdrank | |
| 2005/0018868 A1 | 1/2005 | Chick et al. | |

FOREIGN PATENT DOCUMENTS

| | | |
|---|---|---|
| EP | 1 551 203 A1 | 7/2005 |
| FR | 2 598 875 A1 | 11/1987 |
| GB | 641 718 A | 8/1950 |
| GB | 980 670 A | 1/1965 |
| GB | 2 377 116 A | 12/2002 |
| JP | 2005136895 A | 5/2005 |
| WO | WO 00/24178 A1 | 4/2000 |

OTHER PUBLICATIONS

Invitation to Pay Additional Fees for PCT/US2006/042317; date of mailing Feb. 23, 2007.
Notification of the International Search Report and Written Opinion for PCT/US2006/042317; date of mailing Apr. 16, 2007.

* cited by examiner

*Primary Examiner*—Brian Ensey
(74) *Attorney, Agent, or Firm*—Myers Bigel Sibley & Sajovec (57) ABSTRACT

Stands for a portable audio device include a housing and a mounting member. The mounting member is configured to couple the audio device to the housing at a location selected to reflect sounds generated by a speaker of the audio device away from the housing. Stands may include a resonator cavity in the housing with an outlet opening extending to the resonator cavity from an exterior surface of the housing and a volume of the resonator cavity and a size of the outlet opening extending thereto may be selected to provide a desired resonant frequency response of the resonator cavity to amplify sounds generated by the speaker of the audio device.

22 Claims, 8 Drawing Sheets

SOUND ENHANCING STANDS FOR PORTABLE AUDIO DEVICES

BACKGROUND OF THE INVENTION

The present invention relates to mounting stands for portable audio devices and, more particularly, to stands configured to enhance sound output from such devices.

Portable music players and other audio devices with built-in speakers are becoming increasingly popular. Such devices may be designed purely as music or audio players or may be portable electronic devices with a variety of other functions, which are further configured to operate as music players. For example, cellular telephones, personal digital assistants (PDAs) and the like are now available that may be used to play music and other sounds for a user. The music may be stereophonic, with different respective audio tracks directed to different speakers of the portable audio device.

Such portable audio devices may have, for example, speakers facing toward the side and back of the device. Thus, when the speakers are used with the device placed on its back or side, one of the speakers may be blocked. In other orientations, for example, the back speaker faces forward, but the side speaker faces up. As such, there may be no optimal arrangement for directing both speakers toward the listener, particularly in electronic devices designed to provide capabilities other than playing music. Such a design may arise, for example, as the speakers generally have a minimum physical size and they may generate strong magnetic fields. As such, placement options for the speakers in a compact device may be limited. As a result of problems with RF interference and the like, placement in a cellular phone with the ability to be used as a music player may be even more problematic. In addition, as they are portable devices, a device designer is also limited as the orientation and location of the portable device relative to a listener in use is highly unpredictable.

One approach to providing improved audio is the use of external accessories, such as portable amplified speakers, FM modulators, line-level audio adapters, and so forth. Such accessories may take advantage of the increasing audio quality and drive of portable music devices and, with these increased capabilities, more users may see such devices as a portable means of carrying their entire music collection with them to parties, and so forth. However, playing a device through loudspeakers, as opposed to earphones, or use of other active powered accessories, places a greater drain on the battery of the portable audio device and/or may require auxiliary amplifiers or the like with their own power sources.

Amplified speakers for portable devices may amplify the sound, but are powered instead of passive. Other sound-reinforcing technology is known. For example, the Bose Wave system delays sound in a resonant tube so as to achieve positive reinforcement on exit. Passive radiators are used in some speaker systems, where the main driver excites a non-driven (passive) speaker cone. The passive speaker is generally a distinct device (basically a speaker without a driver) mounted in the same box as the active driver. Another passive device is a driver that can be attached to a wall or table to directly excite the surface and cause the surface to function as the radiator. In this case, the driver generally must be physically coupled to the passive resonator and it acts as a dedicated speaker.

SUMMARY OF THE INVENTION

Embodiments of the present invention include stands for a portable audio device including a housing and a mounting member. The mounting member is configured to couple the audio device to the housing at a location selected to reflect sounds generated by a speaker of the audio device away from the housing. The housing may include a reflecting surface member and the mounting member may couple the audio device to the reflecting surface member at a position displaced therefrom and with the speaker directed towards the reflecting surface member.

In other embodiments, the audio device includes a front face including a user interface, a back face and side faces extending therebetween. A back speaker is positioned to direct sound from the back face of the audio device and the audio device further includes a side speaker positioned to direct sound from one of the side faces of the audio device. The mounting member is configured to couple the audio device to the reflecting surface member at a location selected to reflect sounds generated by the side speaker away from the reflecting surface member. The reflecting surface member may include a passive amplification section positioned proximate the back speaker that vibrates responsive to the sounds generated by the back speaker to passively amplify the sounds generated by the back speaker.

In further embodiments, the mounting member includes clips on a front face of the reflecting surface member configured to mate with mating recesses on the audio device and the stand further includes support members on a back face of the reflecting surface member configured to maintain the housing in an upright orientation on a support surface. The reflecting surface member may be a half-shell having a bowl shaped portion facing the audio device that reflects the sounds generated by the speaker around the audio device. The housing may further include a reflector extending from the reflecting surface member proximate the side speaker.

In other embodiments, the housing includes a resonator shell having an interior volume and a reflecting surface member positioned on the resonator shell over the interior volume to define a resonator cavity having an outlet opening extending thereto from an exterior surface of the housing. The mounting member couples the audio device to the housing at a location selected to direct sound generated by the speaker to the resonator cavity. A volume of the resonator cavity and a size of the outlet opening extending thereto are selected to provide a desired resonant frequency response to amplify the sound generated by the speaker. The opening may be an adjustable size opening configured to allow tuning of the resonant frequency response of the resonator cavity. The resonator cavity may have a volume of about 100 cubic centimeters (cc) to about 200 cc. The adjustable size opening may have a size range from about 5 square centimeters ($cm^2$) to about 30 $cm^2$ and the resonant frequency response of the resonator cavity may be tunable from about 500 hertz (Hz) to about 1500 Hz.

In further embodiments, a sound inlet opening is provided in the reflecting surface member and/or the resonator shell. The mounting member couples the audio device to the housing with the sound inlet opening proximate the speaker to direct sound generated by the speaker to the resonator cavity through the sound inlet opening. A gasket may define a passageway extending between an outlet of the speaker on the audio device to the sound inlet opening and the gasket may direct the sound generated by the speaker to the resonator cavity through the sound inlet opening.

In yet other embodiments, stands for a portable audio device include a housing and a resonator cavity in the housing. An outlet opening extends to the resonator cavity from an exterior surface of the housing. A volume of the resonator cavity and a size of the outlet opening extending thereto are selected to provide a desired resonant frequency response of the resonator cavity to amplify sounds generated by a speaker of the audio device. A mounting member is configured to couple the audio device to the housing at a location selected to direct sounds generated by the speaker of the audio device towards the resonator cavity. The outlet opening may be an adjustable size opening configured to allow tuning of the resonant frequency response of the resonator cavity.

In some embodiments, the speaker is a back speaker of the audio device positioned to direct sound from a back speaker outlet on a back face of the audio device and the audio device further includes a side speaker positioned to direct sound from a side speaker outlet on a side face of the audio device. The outlet opening extends to an external surface of the housing positioned proximate an opposite side of the audio device from the side speaker to provide spatial displacement for stereo sounds generated by the back and side speakers. The housing may also include a reflecting surface member extending proximate the side speaker outlet and the mounting member may be configured to couple the audio device to the reflecting surface member at a location selected to reflect sounds generated by the side speaker away from the reflecting surface member. The portable audio device may be a mobile terminal.

In yet further embodiments, packaged audio devices are provided. The packaged device includes a portable audio device includes a speaker that generates sounds from a speaker outlet on a face thereof and materials associated with the portable audio device, including an electronic accessory, a charger and/or a manual. A packaging shell defines a volume including the portable audio device and/or the materials positioned therein. A packaging cover is positioned proximate the packaging shell. The packaging shell and/or packaging cover are configured to be re-arranged, with the portable audio device and/or the materials removed from the volume, to defined a housing to which the portable audio device may be coupled at a location selected to direct sounds generated by the speaker of the audio device towards the volume. The volume operates as a resonator cavity having a desired resonant frequency response to amplify and/or re-direct sounds generated by the speaker.

In some embodiments, an outer box encloses the packaging shell, including the portable audio device and/or the materials positioned therein. The packaging shell is configured to secure the portable audio device and/or the materials so as to protect the portable audio device and/or the materials positioned therein from external mechanical forces applied to the outer box. The packaging cover may be configured to be positioned over the volume of the packaging shell to define the volume as the resonator cavity and may be configured to mount the portable audio device in the location. The packaging cover may further include an opening extending to the resonator cavity from a position proximate the speaker outlet when the portable audio device is in the location.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "portable audio device" includes devices with or without wireless communications capabilities. An MP3 player or an iPod, available from Apple Computer Corporation, are examples of audio devices that may not have wireless communications capabilities. A "mobile terminal" as used herein refers to portable audio devices having wireless communications capabilities. A mobile terminal may have a wireless signal receiver without transmit abilities or may have both receive and transmit hardware capable of two-way communication over a two-way communication link. Such devices may include cellular or other communications devices with or without a multi-line display; Personal Communications System (PCS) terminals that may combine an MP3 player or the like with voice and/or data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "portable" audio devices may be removably installable in a vehicle or the like, for example, in a cradle, for use in the vehicle.

Figure 1:
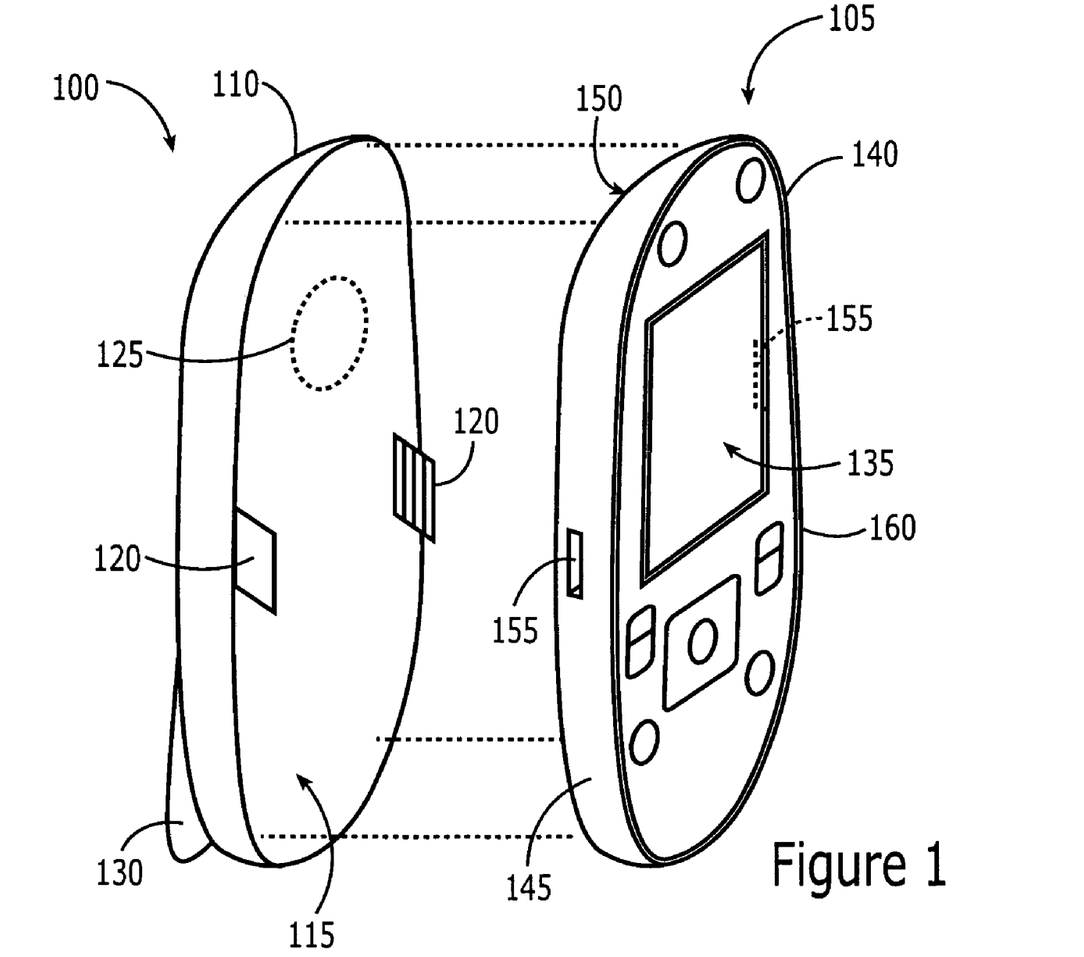
FIG. 1 is an exploded front perspective view of a stand for a portable audio device according to some embodiments of the present invention.
Figure 2:
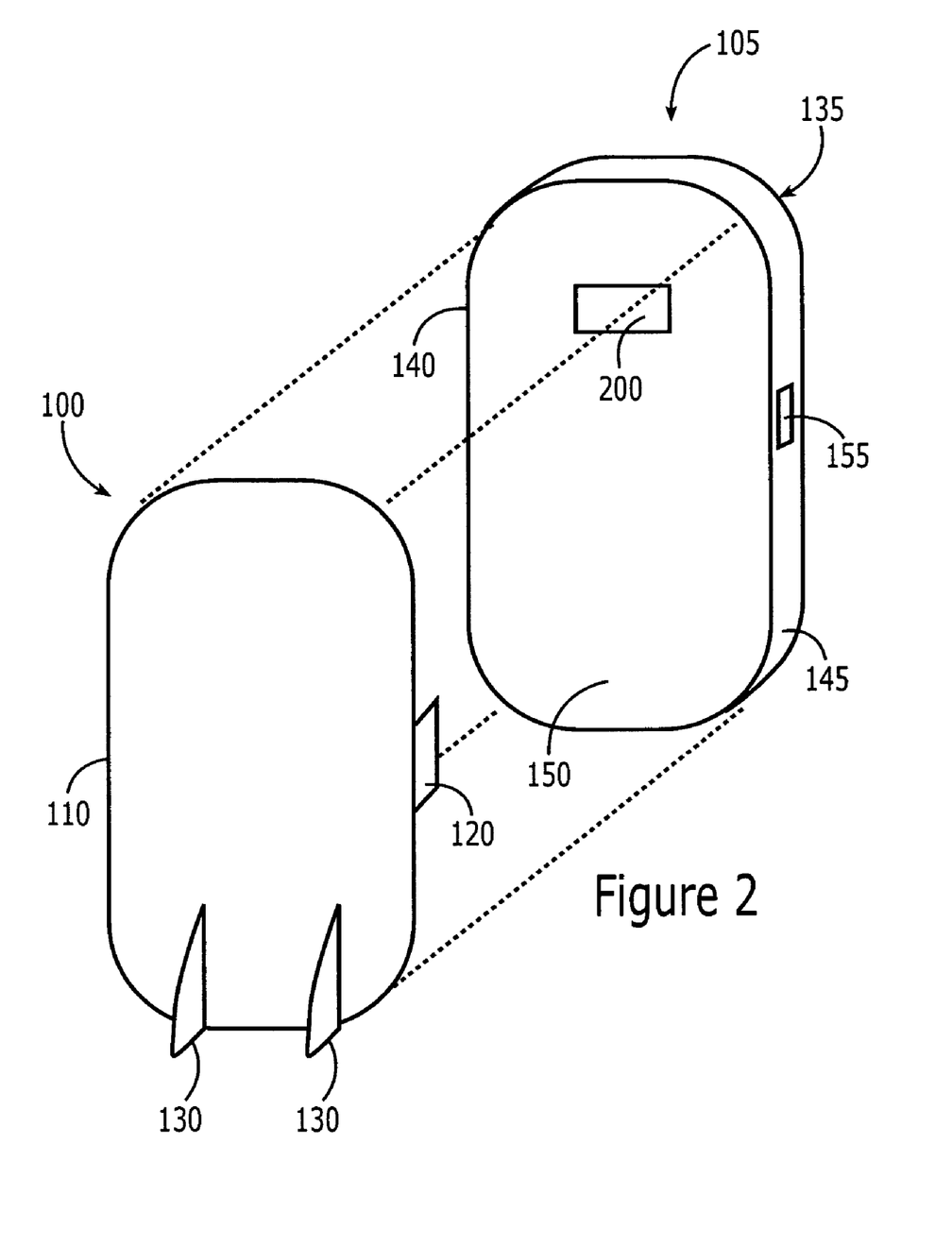
FIG. 2 is an exploded back perspective view of the stand of FIG. 1.

A stand according to some embodiments of the present invention will now be described with reference to the exploded perspective views of FIGS. 1 and 2. As shown in the embodiments of FIGS. 1 and 2, a stand 100 for a portable audio device 105, according to some embodiments, may be a plastic clip-on stand providing a back resonator shell for use when playing music or other audio sounds through speaker(s) of the portable audio device 105. The stand may hold the device 105 in a desired position and the resonator shell may reflect/focus sound toward the user and/or act as a passive amplifier. The focusing may occur by reflection of backward directed sound waves from a rear facing speaker toward a user, rather than allowing such sounds to be dissipated to the rear. Passive amplification may be provided by the shell acting as a passive Helmholtz resonator using the shell's internal geometry and/or an interior volume as will be described for further embodiments herein that may be tuned to force vibrations from the speakers outputs.

The interior of the resonator shell may direct sound from the left and/or right channels, which may be directed to different speakers of the audio device 105, to reinforce rather than cancel sound waves coming from speakers of the device 105. An outside area of the assembly may be used to reflect sound from side speakers to the front as well as rear speakers. Thus, in some embodiments, the resonator shell may serve both as a stand for the audio device 105 and also as a passive resonator. The resonator shell may, thus, let users play speaker music at a louder volume without increasing battery drain, by using the resonator to use existing sound energy more efficiently. This may include focusing more sound toward the user and/or amplifying sound by passive radiation and/or decreasing energy loss from cancellation. As such, the device may be a relatively inexpensive accessory that provides both convenience as a music stand for a portable player and improved audio performance in some embodiments.

Referring again to the embodiments of FIGS. 1 and 2, the stand 100 includes a housing or reflecting surface member 110 and a mounting member 120 configured to couple the audio device 105 to the housing 110 at a location selected to reflect sounds generated by a speaker of the audio device 105 away from the housing 110. The housing in the embodiments of FIGS. 1 and 2, is shown as a reflecting surface member 110 and the mounting member 120 is shown as a pair of clips on a front face of the reflecting surface member 110 configured to mate with mating recesses 155 on the audio device 105. The clips 120 couple the audio device 105 to the reflecting surface member 110 at a position displaced therefrom and with a rear speaker of the audio device 105 directed towards the reflecting surface member 110.

The audio device 105 shown in FIGS. 1 and 2 may include multiple speakers. In particular, audio device 105 has a front face 135 including user interface features, such as a screen, joystick, and selection buttons, and a back face 150 facing in the opposite direction from the front face 135. Side faces 140, 145 extend between the front face 135 and back face 150.

A back or rear speaker of the audio device 105 is positioned within the audio device 105 to direct sound from the back face 150 through a back speaker outlet 200 on the back face 150 of the audio device 105. A side speaker of the audio device 105 is positioned in the audio device 105 to direct sound from the side face 140 to a side speaker outlet 160. The clips 120, in cooperation with mating recesses 155, couple the audio device 105 to the reflecting surface member 110 at a location that is further selected to reflect sounds generated by the side speaker, and exiting through the side speaker outlet 160, away from the reflecting surface member 110.

The reflecting surface member 110 illustrated in the embodiments of FIGS. 1 and 2 is a half-shell shape having a bowl-shaped portion 115 facing the audio device 105, which reflects the sounds generated by the speaker(s) around the audio device 105. Also shown in the embodiments of FIGS. 1 and 2 is a passive amplification section 125 in the reflecting surface member 110 that is positioned proximate the back speaker outlet 200. The passive amplification section 125 vibrates responsive to sounds generated by the back speaker of the audio device 105 so as to passively amplify the sounds generated by the back speaker. For example, the passive amplification section 125 may be selected so as to be a different material and/or have a different thickness than surrounding portions of the reflecting surface member 110 so as to vibrate responsive to sound passing through the back speaker outlet 200 to generate amplified sound waves.

Also shown in the embodiments of FIGS. 1 and 2 are support members 130 positioned on a back face of the reflecting surface member 110. The support members 130 are configured to maintain the stand 100 in an upright orientation on a support surface. Thus, the support members 130, shown as retractable wings in the embodiments of FIGS. 1 and 2, may maintain the portable audio device 105 in an upright orientation while the clips 120, in cooperation with the recesses 155, may hold the audio device 105 in a desired position. Spacing between the speaker outlets 160, 200 of the audio device 105 and the reflecting surface member 110 may be used to improve resonance and provide positive reinforcement of audio sounds generated by the portable audio device 105. More particularly, the sounds generated by side and back speakers may be focused forward towards a user.

The portable audio device 105 as illustrated in FIGS. 1 and 2 is a mobile terminal. Placing the user interface features of the front face 135 facing the user in an upright position in the stand 100 may allow for easier access to controls of both the music player and communication aspects of the mobile terminal 105 while still providing enhanced sound output directed to the user.

Figure 3:
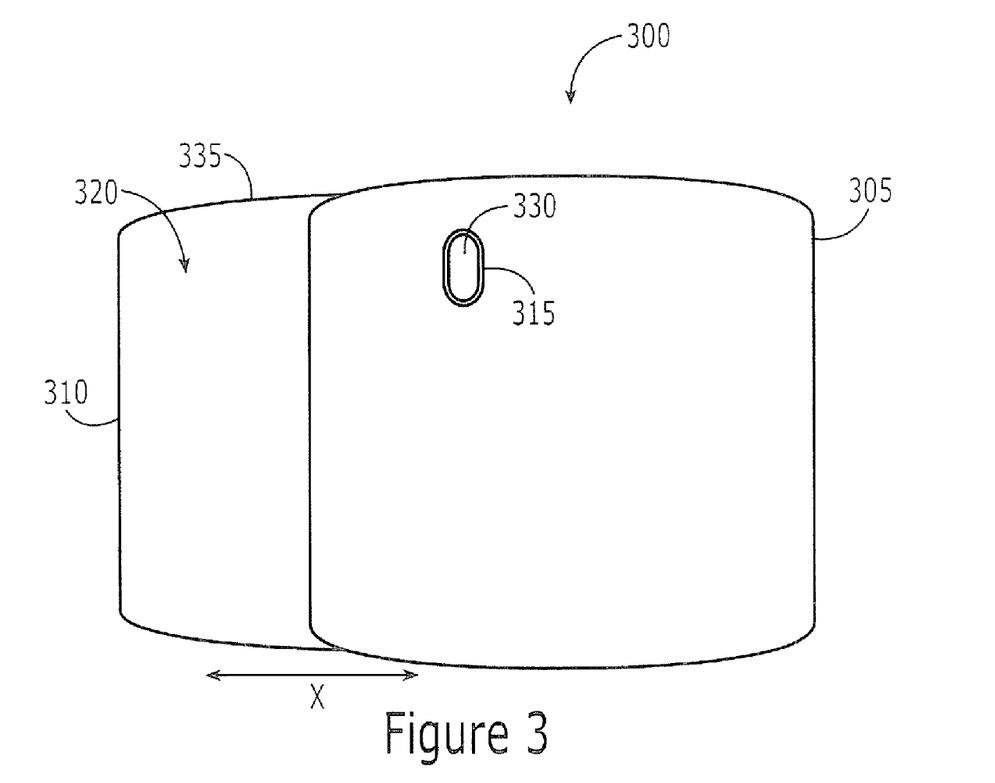
FIG. 3 is a front view of a stand for a portable audio device according to other embodiments of the present invention.
Figure 4A:
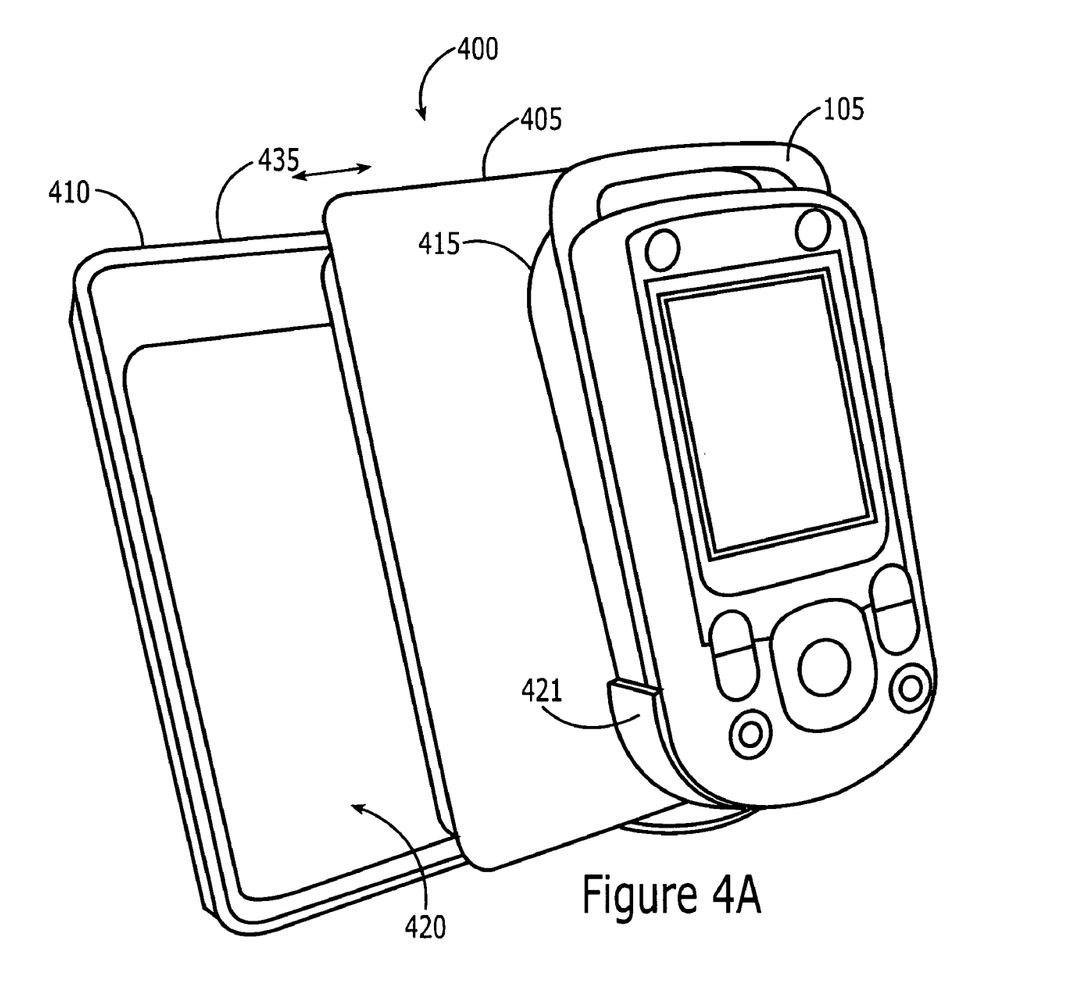
FIG. 4A is a front perspective view of a stand for a portable audio device according to other embodiments of the present invention.
Figure 4B:
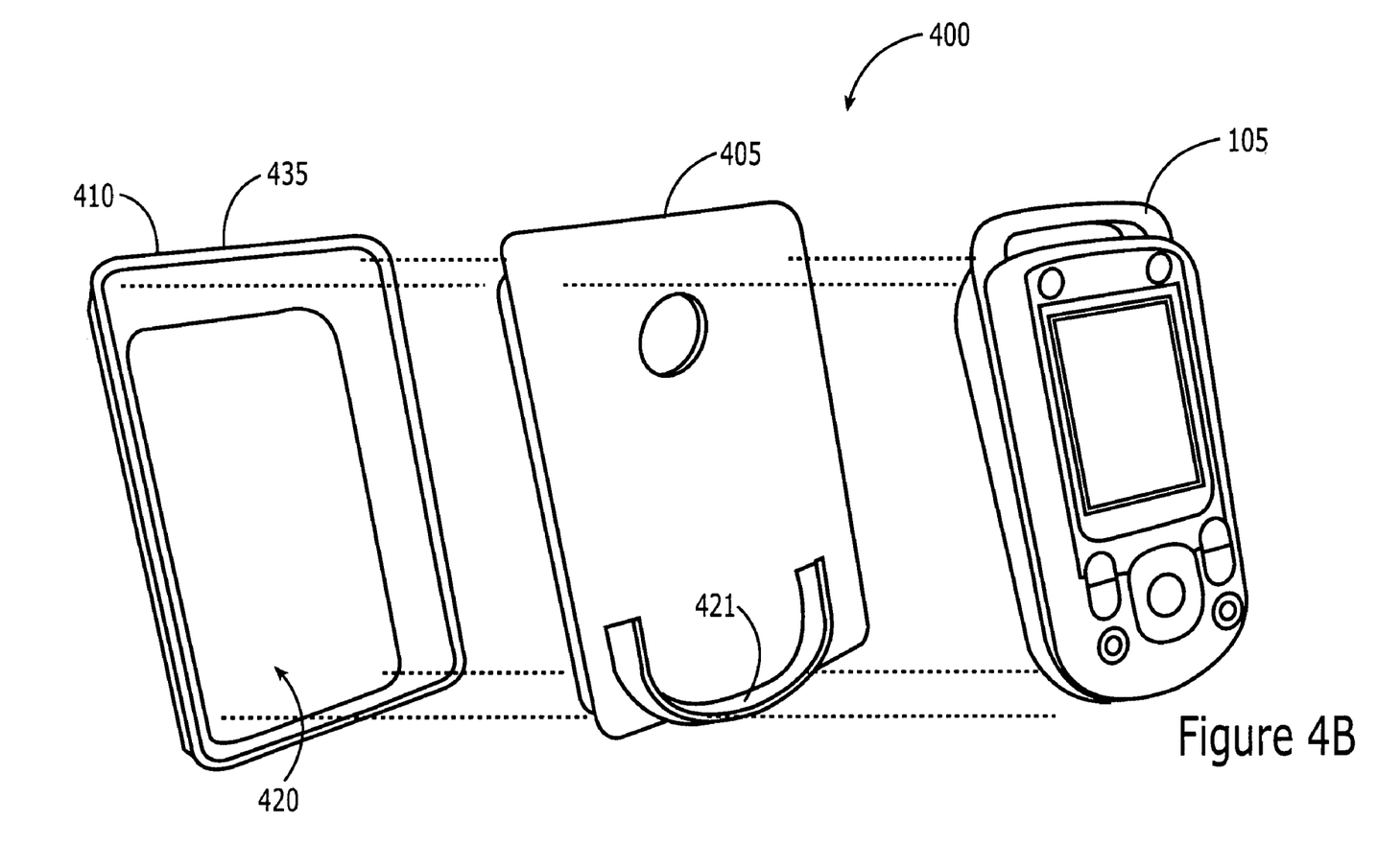
FIG. 4B is an exploded perspective view of the stand of FIG. 4A.

Further embodiments of a stand for a portable audio device will now be described with reference to FIGS. 3-5. Referring first to FIG. 3, the stand includes a housing 300. The housing 300, in the embodiments of FIGS. 3-5, includes a resonator shell 310 having an interior volume or resonator cavity 320 and a reflecting surface member 305. The reflecting surface member 305 is positioned on the resonator shell 310 over the interior volume to define the resonator cavity. The reflecting surface member 305 is positioned so as to define an outlet opening 335 extending to the resonator cavity 320 from an exterior surface of the housing 300.

The housing 300 further includes a mounting member for coupling a portable audio device 105 to the housing 300 at a location selected to direct sound generated by a speaker of the audio device 105 to the resonator cavity 320. The mounting member for the embodiments of FIGS. 3-5 may be clips, such as the clips 120 illustrated in FIG. 1 and/or a mounting cradle configured to receive the audio device 105 or the like.

A volume of the resonator cavity 320 and a size of the outlet opening 335 extending thereto are selected to provide a desired resonant frequency response to amplify sound generated by the speaker of the portable audio device 105. As illustrated in the embodiments of FIGS. 3-5, the opening 335 is an adjustable size opening, where the opening size may be adjusted by shifting the position of the covering reflective surface member 305 along the axis X. The adjustable size opening 335 may be used to tune the resonant frequency response of the resonator cavity 320.

In some embodiments, the resonator cavity 320 has a volume of about 100 cubic cm (cc) to about 200 cc. The adjustable size opening 335 may have a size range from about 5 square centimeters ($cm^2$) to about 30 $cm^2$. The resonant frequency response of the resonator cavity 320 may be tunable from about 500 hertz (Hz) to about 1500 Hz.

Referring to FIG. 3, the reflecting surface member 305 and the face of the resonator shell 310 adjacent thereto may be about 10 cm in length and 10 cm in width, where X represents the length axis. In addition, the length of the opening 335 may be adjusted between about 0.5 cm to about 3 cm to provide an opening 335 area of about 5 $cm^2$ to about 30 $cm^2$.

The housing 300 may be formed from a plastic material. A thickness of the housing may be about 0.7 mm to about 1 mm thick of the plastic material. In addition, while shown as a regular geometry in FIGS. 3-5, the internal volume defining the resonator cavity 320 may be an irregular geometry in other embodiments of the present invention.

Also shown in FIG. 3 is a sound inlet opening 330 in the reflecting surface member 305. As seen in FIGS. 4A, 4B, and 5, the audio device 105 may be coupled to the housing 300, 400, 500 with the sound inlet opening 330 positioned proximate a rear speaker outlet 200 of the portable audio device 105 to direct sound generated by the rear speaker to the resonator cavity 320, 420, 520 through the sound inlet opening 330. As also shown in the embodiments of FIG. 3, a gasket 315 may define a passageway extending between the outlet 200 (FIG. 2) on the audio device 105 to the sound inlet opening 330 that directs the sounds generated by the speaker of the audio device 105 to the resonator cavity 320, 420, 520 through the sound inlet opening 330.

Some embodiments of the present invention will now be further described with reference to FIGS. 4A and 4B. FIG. 4B is an exploded perspective view of the embodiments of FIG. 4A. As seen in FIGS. 4A and 4B, a portable audio device 105 is positioned in a mounting cradle 421 on a housing 400. More particularly, as illustrated in FIGS. 4A and 4B, the audio device 105 is positioned on a reflecting surface member 405 of the housing 400. The reflecting surface member 405, in combination with a resonator shell 410, defines a resonator cavity 420 of the housing 400 with an outlet opening 435 extending to the cavity 420 from an exterior surface of the housing 400. A gasket 415 is shown coupling a rear speaker outlet 200 (FIG. 2) to an opening in the reflecting surface member 405 to direct the sound output from the speaker to the resonator cavity 420 in the housing 400.

Figure 5:
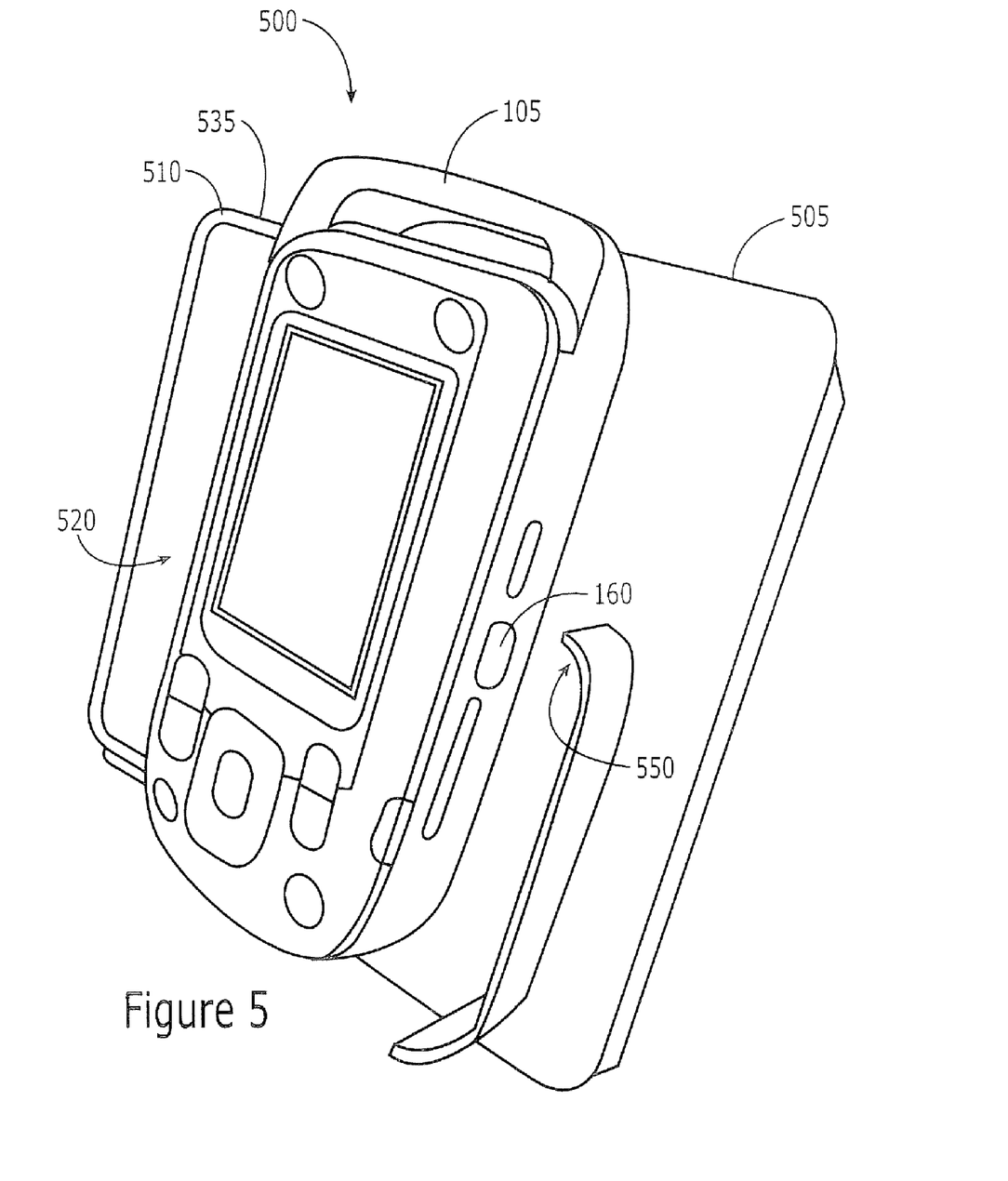
FIG. 5 is a front perspective view of a stand for a portable audio device according to some embodiments of the present invention.

Referring now to FIG. 5, a portable audio device 105 is shown coupled to a housing 500 including a reflecting surface member 505 and a resonator shell 510 defining a resonator cavity 520. Also seen in FIG. 5 is the side speaker outlet 160. In the embodiments of FIG. 5, a reflector 550 extends from the reflecting surface member 505 proximate the side speaker outlet 160. Sound output characteristics emitting from the side speaker outlet 160 may be adjusted by adjusting the position and/or angle of the reflector 550. In some embodiments, as illustrated in FIG. 5, the reflector 550 extends at an angle of about 60 degrees with respect to the reflecting surface member 505. While the reflecting surface member 305, 405, 505 is shown as a flat baffle member in FIGS. 3-5, other shapes, such as the half shell illustrated in FIGS. 1 and 2, may also be utilized in various embodiments of the present invention in combination with a resonator shell or without the addition of a resonator shell defining a resonator cavity. Furthermore, while described with reference to embodiments including both rear and side speakers, embodiments of the present invention may be used with single speaker devices having speaker outlets in different configurations, where the mounting member may suitable position the portable audio device to provide improved sound quality for such different configuration. For an audio device 105 having stereo side speakers, one on each side, two reflectors 550 may be used proximate an outlet from each side speaker so as to focus sound towards a user facing the audio device 105.

A portion of the reflecting surface member 505 may be provided that extends proximate the side speaker outlet 160 so as to reflect sounds generated by the side speaker of the audio device 105 away from the reflecting surface member 505. Thus, redirection by reflection of sound emitted from the side speaker outlet opening 160 may be provided in embodiments with or without the reflector 550 by providing a portion of the reflecting surface member 505 extending proximate the outlet 160.

As also seen in the embodiments of FIG. 5, spatial displacement of sounds emitted from a rear and side speaker may be provided. In particular, the outlet opening 535 is positioned so as to extend to an external surface of the housing 500 proximate an opposite side of the audio device 105 from the side speaker outlet 160 to provide spatial displacement for stereo sounds or the like generated by back and side speakers of the device 105.

Further embodiments of the present invention providing a packaged audio device 600 will now be described with reference to FIG. 6. The embodiments illustrated in FIG. 6 take advantage of the substantially box-shaped characteristic of the embodiments described with reference to FIGS. 3-5 so as to provide a sound enhancing stand for a packaged portable audio device as part of the packaging for the device itself. As such, simple written instructions or the like may be provided to a user so that the packaging may be assembled as a stand after purchase of the packaged audio device 600. As such, a user may be provided appreciable improvement in the level and presentation of sound by use of a stand increasing the level in stereo perception (apparent size) of the audio signal using packaging materials sold with the audio device itself.

Figure 6:
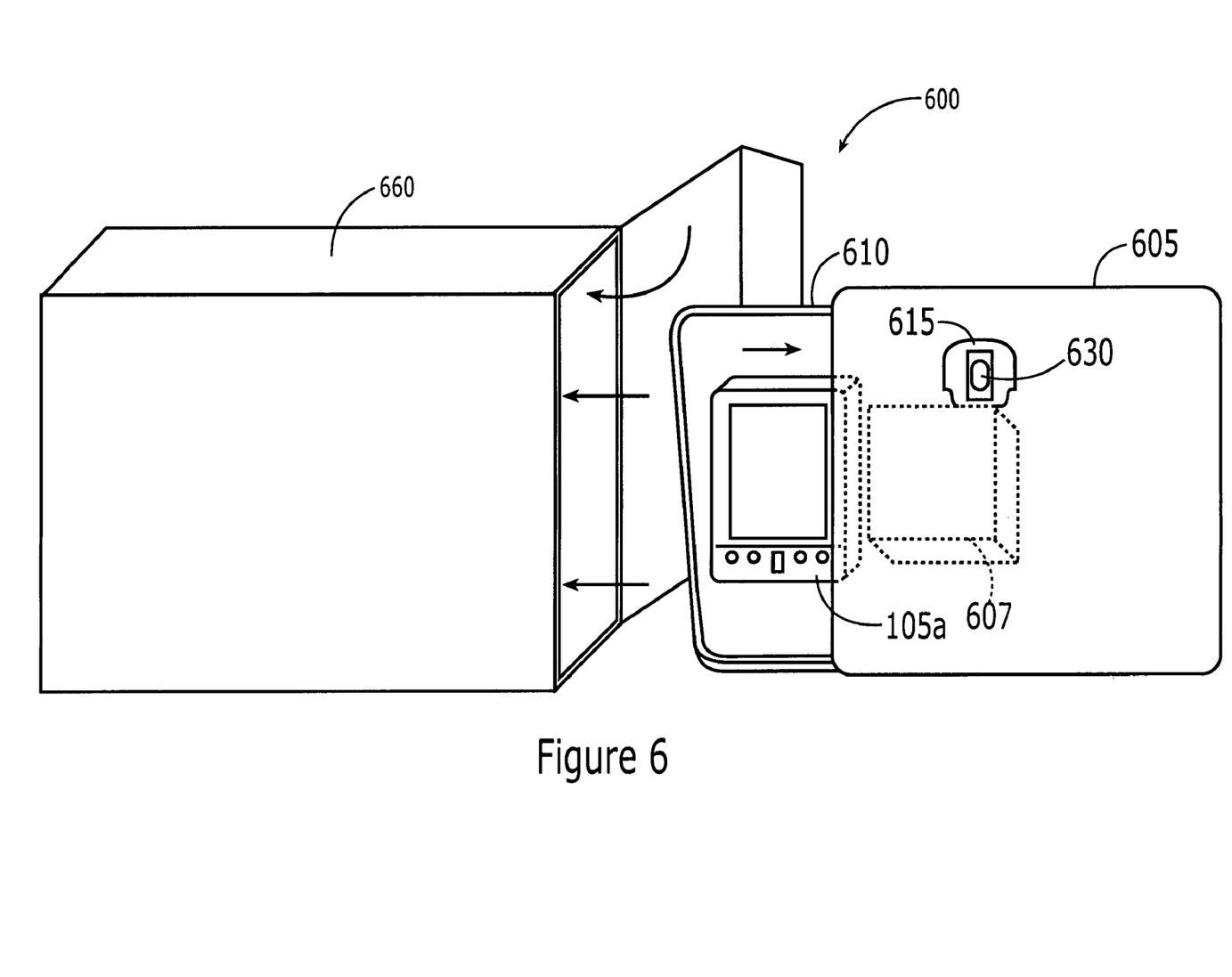
FIG. 6 is a front perspective view of a packaged portable audio device according to some embodiments of the present invention.

As shown in the embodiments of FIG. 6, the packaged audio device 600 includes a portable audio device 105a including a speaker that generates sounds from a speaker outlet on a face thereof. The packaged audio device 600 further includes materials 607 associated with the portable audio device 105a. For example, the materials 607 may include an electronic accessory, a charger, a manual and/or the like, that are sold in combination with the audio device 105a to an end user. The packaging shell 610 defines a volume including the portable audio device 105a and the materials 607 as illustrated in FIG. 6. A packaging cover 605 is positioned proximate the packaging shell. The packaging shell 610 and/or packaging cover 605 are configured to be rearranged, with a portable audio device 105a and/or the materials 607 removed from the volume defined by the packaging shell 610, to define a housing to which the portable audio device 105a may be coupled. As described previously, the portable audio device 105a may be coupled at a location selected to direct sounds generated by the speaker of the audio device 105a towards the volume, which operates as a resonator cavity having a desired resonant frequency response to amplify and/or redirect sounds generated by the speaker.

An outer box 660 is also shown. As sold to a consumer, the outer box 660 may enclose the packaging shell 610 including the portable audio device 105*a* and/or the materials 607 positioned therein. As shown in FIG. 6, the packaging shell 610 may be configured to secure the portable audio device 105*a* and/or the materials 607 so as to protect the portable audio device 105*a* and/or the materials 607 therein from external mechanical forces applied to the outer box 660. The packaging cover 605 may be positioned over the volume of the packaging shell to define the volume of the shell as a resonator cavity and to mount the portable audio device in a desired location. As such, the packaging cover 605 may further include an opening 630 extending to the defined resonator cavity from a position proximate a speaker outlet when the portable audio device 105*a* is in the desired location and a grommet or gasket 615 coupling a speaker outlet of the device 105*a* to the opening 630.

Figure 7:
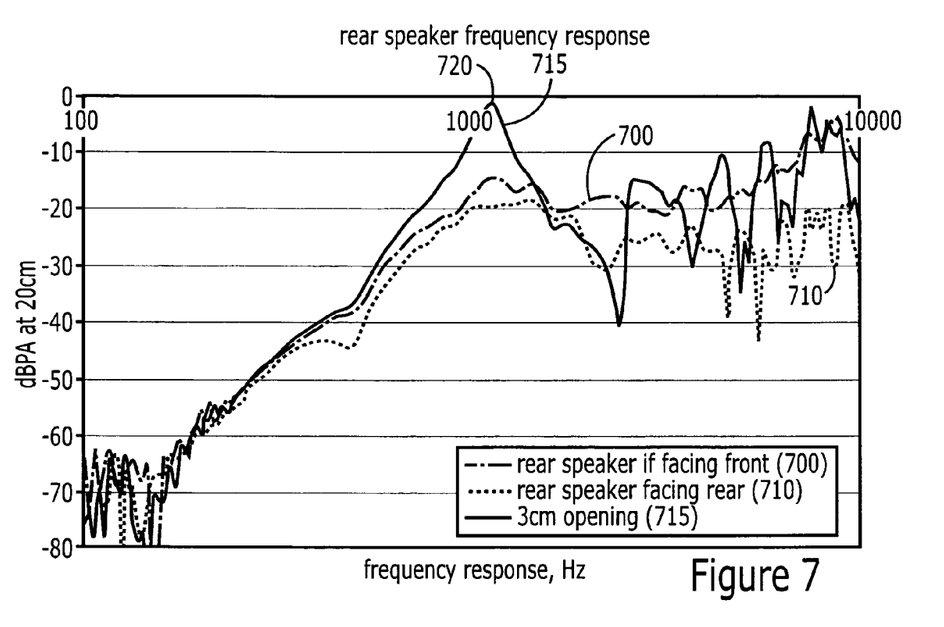
FIG. 7 is a graphical illustration of a frequency response for a rear speaker of a portable audio device according to some embodiments of the present invention.

Frequency response characteristics provided by various embodiments of the present invention will now be further described with reference to FIGS. 7 and 8. FIG. 7 illustrates frequency response for a rear speaker having a sound outlet that is directed to a resonator cavity. Curve 700 provides frequency response characteristics for the rear speaker with the rear speaker facing forward. In other words, with reference to the embodiments illustrated in FIG. 5, the front face 135 of audio device 105 would be flipped to face the reflecting surface member 505 and the outlet 200 (FIG. 2) would be facing forward for the curve 700 of FIG. 7. Curve 710 represents frequency response with the rear speaker outlet facing the rear and curve 715 represents the frequency response where the opening 335, 435, 535 has a length X of 3 cm and an opening area of approximately 30 cm$^2$.

As shown in FIG. 7, a frequency response improvement in amplitude, in particular, is seen at the resonant frequency 720. The frequency at which the resonant frequency 720 peak occurs may be adjusted by changing the size of the opening 335, 435, 535, where it may be adjusted to lower frequencies by reducing the size of the opening 335, 435, 535. The resonant frequency characteristics of the frequency response may further be smoothed by using a horn type internal geometry for the resonant cavity 320, 420, 520. For example, it may reduce or eliminate corners in the box to provide a smoother frequency response and improvement across a greater frequency range. As seen in FIG. 7, the resonant frequency 720 is at a frequency slightly above 1000 Hz.

Figure 8:
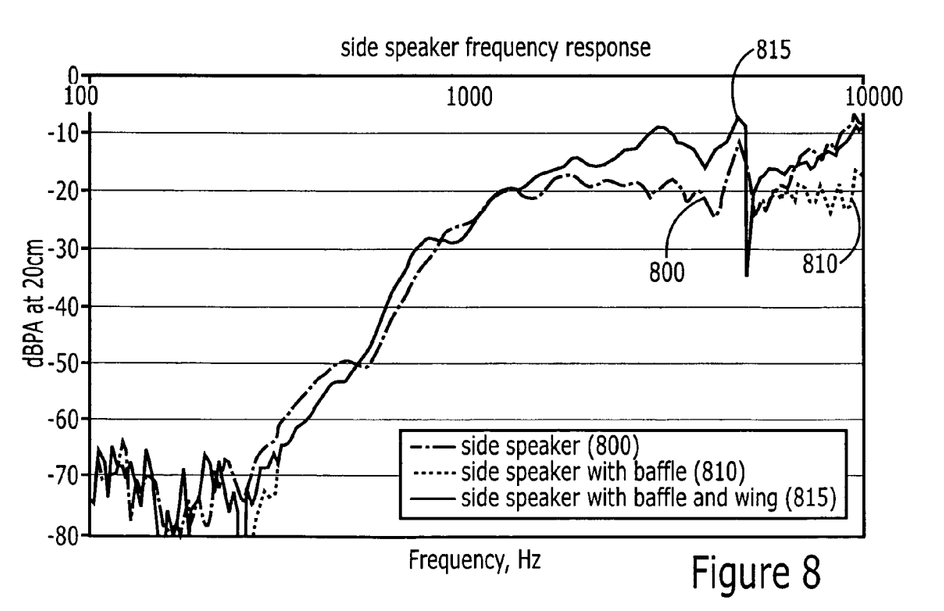
FIG. 8 is a graphical illustration of a frequency response for a side speaker of a portable audio device according to some embodiments of the present invention.

FIG. 8 illustrates frequency response characteristics for a side speaker according to some embodiments of the present invention. Curve 800 illustrates side speaker performance without a baffle reflecting surface member 305, 405, 505 and without a reflector wing 550. Curve 810 represents response with a baffle but without a resonator wing. Curve 815 represents response with a baffle and a reflector wing. As seen in FIG. 8, high frequency response improvement is shown past 1 kilohertz using a baffle and further improvement is provided using the reflector wing As seen in FIGS. 7 and 8, an improvement in sound output level in a range of about 10 to about 15 decibels may be realized at a first resonant frequency 720 of the reflecting volume 320, 420, 520. Such a frequency response can further be shown using a lumped parameter analysis. Improvement of the level at the first resonance frequency may, thus, be expected to be approximately 15 decibels or more when compared to the output level of a speaker when facing away from the user. The reflector wing 550 may be most effective in improving frequency response in the audio frequency range at 5 kilohertz or higher. Practical size considerations for the reflector 550, in some embodiments as illustrated in FIG. 5, may be a width of approximately 3-5 cm and a height of approximately 20 cm on a reflecting surface member 505 of about 10 cm by 10 cm.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A stand for a portable audio device, comprising:
a housing, wherein the housing comprises a resonator shell having an interior volume and a reflecting surface member positioned on the resonator shell over the interior volume to define a resonator cavity having an outlet opening extending thereto from an exterior surface of the housing; and
a mounting member configured to couple the audio device to the housing at a location selected to reflect sounds generated by a speaker of the audio device away from the housing, wherein the mounting member couples the audio device to the housing at a location selected to direct sound generated by the speaker to the resonator cavity and wherein a volume of the resonator cavity and a size of the outlet opening extending thereto are selected to provide a desired resonant frequency response to amplify the sound generated by the speaker, and wherein the opening comprises an adjustable size opening configured to allow tuning of the resonant frequency response of the resonator cavity.

2. The stand of claim 1, wherein the housing comprises a reflecting surface member and wherein the mounting member couples the audio device to the reflecting surface member at a position displaced therefrom and with the speaker directed towards the reflecting surface member.

3. The stand of claim 2, wherein the audio device includes a front face including a user interface, a back face and side faces extending therebetween and wherein the speaker comprises a back speaker positioned to direct sound from the back face of the audio device and wherein the audio device further comprises a side speaker positioned to direct sound from one of the side faces of the audio device and wherein the mounting member is configured to couple the audio device to the reflecting surface member at a location selected to reflect sounds generated by the side speaker away from the reflecting surface member.

4. The stand of claim 2, wherein the reflecting surface member includes a passive amplification section positioned proximate the back speaker that vibrates responsive to the sounds generated by the back speaker to passively amplify the sounds generated by the back speaker.

5. The stand of claim 2, wherein the mounting member comprises clips on a front face of the reflecting surface member configured to mate with mating recesses on the audio device and wherein the stand further comprises support members on a back face of the reflecting surface member configured to maintain the housing in an upright orientation on a support surface.

6. The stand of claim 2, wherein the reflecting surface member comprises a half-shell having a bowl shaped portion facing the audio device that reflects the sounds generated by the speaker around the audio device.

7. The stand of claim 4, wherein the housing further comprises a reflector extending from the reflecting surface member proximate the side speaker.

8. The stand of claim 1, wherein the resonator cavity has a volume of about 100 cubic centimeters (cc) to about 200 cc.

9. The stand of claim 8, wherein the adjustable size opening has a size range from about 5 square centimeters ($cm^2$) to about 30 $cm^2$ and wherein the resonant frequency response of the resonator cavity is tunable from about 500 hertz (Hz) to about 1500 Hz.

10. The stand of claim 1, further comprising a sound inlet opening in the reflecting surface member and/or the resonator shell and wherein the mounting member couples the audio device to the housing with the sound inlet opening proximate the speaker to direct sound generated by the speaker to the resonator cavity through the sound inlet opening.

11. The stand of claim 10, further comprising a gasket defining a passageway extending between an outlet of the speaker on the audio device to the sound inlet opening that directs the sound generated by the speaker to the resonator cavity through the sound inlet opening.

12. A for a portable audio device, the stand comprising:
a housing;
a resonator cavity in the housing;
an outlet opening extending to the resonator cavity from an exterior surface of the housing, wherein a volume of the resonator cavity and a size of the outlet opening extending thereto are selected to provide a desired resonant frequency response of the resonator cavity to amplify sounds generated by a speaker of the audio device; and
a mounting member configured to couple the audio device to the housing at a location selected to direct sounds generated by the speaker of the audio device towards the resonator cavity, wherein the outlet opening comprises an adjustable size opening configured to allow tuning of the resonant frequency response of the resonator cavity.

13. The stand of claim 12, wherein the adjustable size opening has a size range from about 5 square centimeters ($cm^2$) to about 30 $cm^2$ and wherein the resonant frequency response of the resonator cavity is tunable from about 500 hertz (Hz) to about 1500 Hz.

14. The stand of claim 12, further comprising a sound inlet opening in the housing and wherein the mounting member couples the audio device to the housing with the sound inlet opening proximate the speaker to direct sound generated by the speaker to the resonator cavity through the sound inlet opening.

15. The stand of claim 14, further comprising a gasket defining a passageway extending between an outlet of the speaker on the audio device to the sound inlet opening that directs the sound generated by the speaker to the resonator cavity through the sound inlet opening.

16. The stand of claim 12, wherein the speaker comprises a back speaker of the audio device positioned to direct sound from a back speaker outlet on a back face of the audio device and wherein the audio device further comprises a side speaker positioned to direct sound from a side speaker outlet on a side face of the audio device and wherein the outlet opening extends to an external surface of the housing positioned proximate an opposite side of the audio device from the side speaker to provide spatial displacement for stereo sounds generated by the back and side speakers.

17. The stand of claim 16, wherein the housing includes a reflecting surface member extending proximate the side speaker outlet and wherein the mounting member is configured to couple the audio device to the reflecting surface member at a location selected to reflect sounds generated by the side speaker away from the reflecting surface member.

18. The stand of claim 17, wherein the housing further comprises a reflector extending from the reflecting surface member proximate the side speaker outlet.

19. The stand of claim 17, wherein the portable audio device comprises a mobile terminal.

20. A packaged audio device, comprising:
a portable audio device including a speaker that generates sounds from a speaker outlet on a face thereof;
materials associated with the portable audio device including an electronic accessory, a charger and/or a manual;
a packaging shell defining a volume including the portable audio device and/or the materials positioned therein; and
a packaging cover positioned proximate the packaging shell;
wherein the packaging shell and/or packaging cover are configured to be re-arranged, with the portable audio device and/or the materials removed from the volume, to define a housing to which the portable audio device may be coupled at a location selected to direct sounds generated by the speaker of the audio device towards the volume, which operates as a resonator cavity having a desired resonant frequency response to amplify and/or re-direct sounds generated by the speaker; and
wherein the packaged audio device further comprises an outer box enclosing the packaging shell including the portable audio device and/or the materials positioned therein and wherein the packaging shell is configured to secure the portable audio device and/or the materials so as to protect the portable audio device and/or the materials positioned therein from external mechanical forces applied to the outer box.

21. The packaged audio device of claim 20, wherein the packaging cover is configured to be positioned over the volume of the packaging shell to define the volume as the resonator cavity and is configured to mount the portable audio device in the location.

22. The packaged audio device of claim 21, wherein the packaging cover further comprises an opening extending to the resonator cavity from a position proximate the speaker outlet when the portable audio device is in the location.

* * * * *